United States Patent Office 2,875,848
Patented Mar. 3, 1959

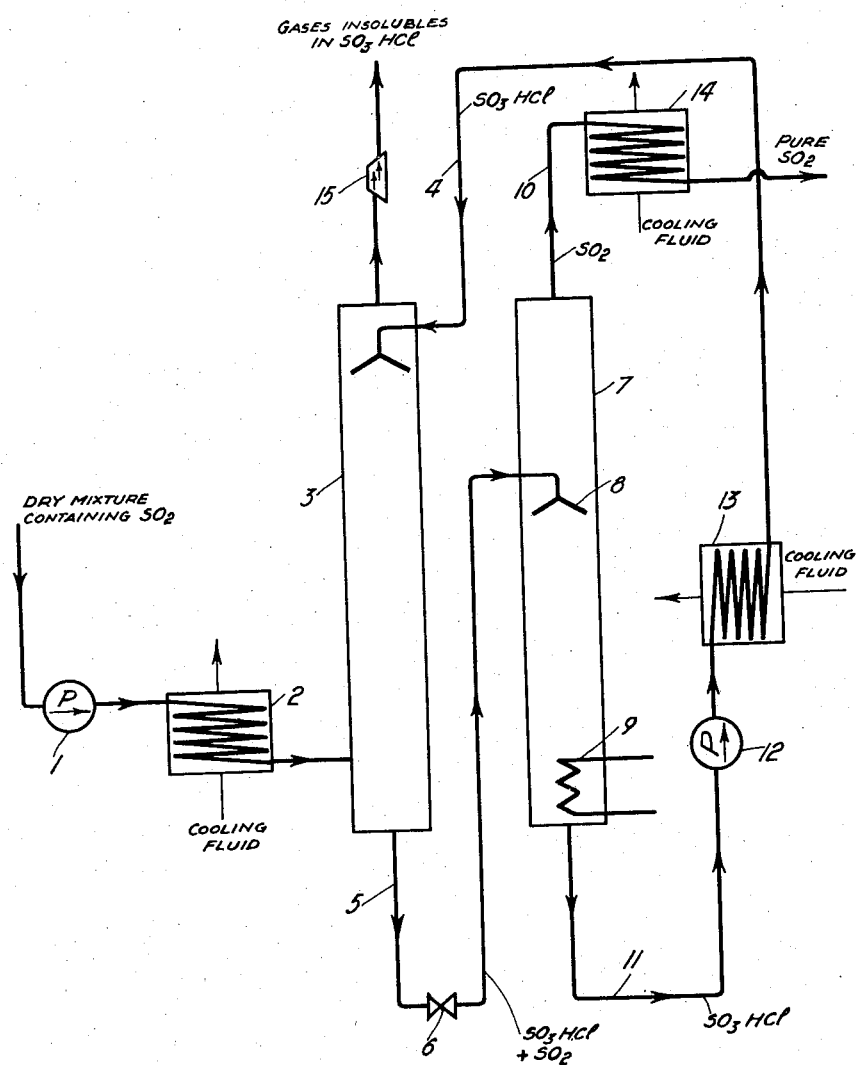

2,875,848

METHOD OF PREPARATION OF SULFUR DIOXIDE

Marie Edouard Joseph Cathala, Toulouse, France

Application July 12, 1956, Serial No. 597,340

Claims priority, application France September 16, 1955

7 Claims. (Cl. 183—115)

The present invention relates to a method of preparation of sulphur dioxide, and especially of liquid sulfur dioxide, pure and dry.

Liquid sulfur dioxide is a valuable product, either as a refrigerating agent or for the preservation of foodstuffs. Unfortunately, the methods of extraction of the industrial mixtures in which it is contained (by the roasting of sulfuretted compounds with air and the combustion gases of sulfur which generally contain one or more of carbon dioxide, oxygen and nitrogen as impurities) are not very convenient and they are costly to employ. The usual methods of preparation of sulfur dioxide consist in absorbing the gaseous $SO_2$ from the industrial mixtures in which it is contained, generally with a content of 10 to 20%, by fixing it in the form of the $HSO_3^-$ ion by aqueous solutions of various substances, mineral or organic: basic lyes of sulfites of sodium, ammonium, aluminum or zinc; solutions of ortho-toluidine, of xylidines, or of various amines.

These methods of absorption have the drawback of giving a gaseous $SO_2$ saturated with water vapour. The subsequent regeneration is always incomplete, since, in the presence of the small quantities of oxygen which are always present, the $HSO_3^-$ ion becomes oxidised and the gaseous $SO_2$ converted to sulfate cannot be recovered. Finally, the heating of the solution in order to decompose the $HSO_3^-$ ions consumes a substantial quantity of steam. The cost of drying and compression in order to obtain liquid sulfur dioxide makes its price prohibitive for certain very attractive industrial applications, for example the direct production of pure sulfuric anhydride.

Attempts have been made to avoid these drawbacks, and in particular to dispense with the use of refrigerating machines which have been essential up to the present time when the solution of sulfur dioxide in the usual aqueous absorbants is degasified.

During the course of the work which has resulted in the bringing to perfection of a method complying with these conditions, the applicant has found that chlorosulfonic acid—which is a liquid product of slight volatility—has a considerable solvent power for gaseous $SO_2$ at a temperature of 10° C. The chloro-sulfonic acid, having dissolved more than twenty per cent of its weight of $SO_2$, forms a stable solution at atmospheric pressure. As compared with water, the solvent properties of which in respect of sulfur dioxide are well known, comparative tests have given the results as indicated in the following table.

| Temperatures | 20° C. | | | | 10° C. | | | |
|---|---|---|---|---|---|---|---|---|
| Pressure of $SO_2$, atm | 1 | 0.75 | 0.5 | 0.1 | 1 | 0.75 | 0.5 | 0.1 |
| 100 grams of water dissolve | 10.7 | 8.2 | 5.5 | 1.4 | 15.4 | 10 | 7.9 | 1.7 |
| 100 grams of chloro-sulfonic acid dissolve | 12.5 | 10.0 | 7 | 1.0 | 26.5 | 16.3 | 8.9 | 1.5 |

The advantage in favour of chloro-sulfonic acid is accentuated when the temperature is lowered: at 0° C., 100 grams of chloro-sulfonic acid, after having absorbed 60 grams of $SO_2$, can form a stable solution at atmospheric pressure. At low temperatures (at which water and aqueous solutions could no longer be used) liquid sulfur dioxide and chloro-sulfonic acid remain miscible in all proportions down to about —75° C.

Now chloro-sulfonic acid is an industrial product the manufacture of which is easy and cheap to prepare by the direct action of gaseous hydrochloric acid on oleum or on sulfuric anhydride.

The idea has been suggested of using these discoveries in the preparation of sulfur dioxide. The method in conformity with the present invention thus consists essentially in extracting the sulfur dioxide from the mixtures in which it is contained, by anhydrous chloro-sulfonic acid, and in regenerating it under conditions which permit of the direct condensation of the anhydride by cooling.

In order to prepare pure sulfur dioxide in the liquid state, the gases derived from roasting of sulfuretted compounds in air or from the combustion of sulfur in air can be treated. A combustion of this kind in air can preferably be carried out under a pressure of several atmospheres, in practice 5 to 10 atm. There can easily be obtained in this way mixtures titrating up to 20% of sulfurous gases accompanied by a few thousandths of sulfuric anhydride. In these conditions, the recovery of the heat energy obtained from the reaction is particularly complete and useful.

The invention is illustrated in the accompanying drawing.

Referring to the drawing, after having been dried, the gases containing sulfur dioxide circulated by pump 1 are cooled in cooler 2 to a temperature in the vicinity of 2° or 3° C.; the gases are then treated with chloro-sulfonic acid in an apparatus 3 of the type in which the gas is bubbled through the liquid arriving by duct 4, or of the type comprising a packing of pebbles or the like, which enables effective contact to be obtained between the gas and the liquid. Depending on the temperature and the partial pressure of the $SO_2$, solutions are obtained in duct 5 containing from 40 to 50% by weight of sulfur dioxide.

The solvent properties of the chloro-sulfonic acid with respect to $SO_3$ are furthermore such that this valuable product does not interfere with the production of liquid sulfur dioxide, but is on the contrary recoverable from the said solvent.

The solutions are then de-gasified by sending them to the summit of a tower 7 or other de-gasifying apparatus of the usual type in which the liquid falls down from level 8 and becomes progressively heated (due to heater 9) until it reaches, at the base of a tower, a temperature sufficient to liberate almost the whole of the dissolved sulfur dioxide which leaves tower 7 by duct 10. The solvent leaves column 7 by duct 11 and can be recycled by pump 12, through cooler 13 to apparatus 3 by duct 4.

The working pressure of this de-gasifying column 7 is adjusted to such a value that the water supplied to a condenser 14 will permit of the direct liquefaction of the sulfur dioxide in the pure and dry state.

After having freed the inert gases under pressure from all their gaseous $SO_2$, the inert gases may be expanded in a turbine 15, if necessary after a previous heating, thus making it possible to recover part or all of the energy which has been expended in their compression.

The extraction of the sulfur dioxide by chloro-sulfonic acid also has a certain advantage when it is desired to separate mixtures of chlorine and gaseous $SO_2$ such as those which are obtained by the reaction of sulfuric anhydride at high temperature on sulfates or by the thermal decomposition of chloro-sulfonic acid. In this case, mixtures are obtained in equi-molecular proportions of chlorine and sulfur dioxide which the existence of an azeotrope prevents from being completely separated by distillation. The use of chloro-sulfonic acid is very effective in breaking down this azeotrope.

When the temperature of absorption is not sufficiently low, the gases treated by chloro-sulfonic acid may carry off a troublesome content of this product, in spite of its low vapour tension. It is very easy to stop the last traces of this compound by washing with concentrated sulfuric acid, which readily dissolves the chloro-sulfonic acid.

It should be noted that the method of preparation in accordance with the invention can be applied to mixtures containing any quantity more or less considerable of sulfur dioxide.

What I claim is:

1. A method of extracting pure, sulfur dioxide from a gaseous mixture consisting of sulfur dioxide, nitrogen, oxygen, and carbon dioxide, which comprises coacting said mixture with a stream of chloro-sulfonic acid, thereby dissolving in said stream at least partially the sulfur dioxide contained in said mixture, extracting at least a major portion of the dissolved surfur dioxide.

2. A method of extracting pure, dry, liquid sulfur dioxide from a gaseous mixture consisting of sulfur dioxide, nitrogen, oxygen and carbon dioxide, which comprises drying and cooling said mixture, contacting said dried and cooled mixture with a stream of chloro-sulfonic acid, thereby dissolving in said stream at least partially the sulfur dioxide contained in said mixture, heating under pressure said stream containing sulfur dioxide dissolved therein, thereby allowing the extraction of the dissolved sulfur dioxide, and cooling the extracted sulfur dioxide.

3. The method claimed in claim 2, wherein said cooling of the gaseous mixture brings the temperature of said mixture to about 2° to 3° C.

4. A method claimed in claim 2, wherein the contacting is performed by bubbling said gaseous mixture through said stream of chloro-sulfonic acid.

5. The method as claimed in claim 2, wherein the contacting is performed in a packed tower.

6. A method as claimed in claim 1, in which said gaseous mixture is compressed to a pressure between 5 and 10 atmospheres absolute before said mixture is brought into contact with the chloro-sulfonic acid.

7. A method as claimed in claim 2, wherein the de-gasified sulfur dioxide is passed through a cooler using a cooling fluid, the pressure of said de-gasified sulfur dioxide and the temperature of said cooling fluid being chosen in such manner that the gaseous sulfur dioxide is converted to the liquid state.

References Cited in the file of this patent

UNITED STATES PATENTS 1,046,915     Wedge _____ Dec. 10, 1912

OTHER REFERENCES

"Solubilities of Inorganic and Organic Compounds," by A. Seidell, volume 1, page 707, Van Nostrand Co., N. Y., 1919.